United States Patent Office 3,362,994
Patented Jan. 9, 1968

3,362,994
2',4'-DIHYDROXYACETOPHENONE
DIMETHYLHYDRAZONE
Daniel Anthony Scola, Andover, Mass., assignor to Monsanto Research Corporation, St. Louis, Mo., a corporation of Delaware
No Drawing. Filed Oct. 1, 1964, Ser. No. 400,893
1 Claim. (Cl. 260—566)

This invention relates to novel herbicidal materials, and more particularly, provides novel ketone dialkylhydrazones useful for the suppression of the growth of undesired vegetation.

The novel compounds provided in accordance with this invention are of the formula $$(HO)_n\text{—}Ar\text{—}\underset{Alk_1}{\overset{}{C}}\text{=}\underset{Alk_3}{\overset{}{N}}\text{N—}Alk_2$$

where $n$ is an integer of from 1 to 3, each Alk is a saturated acyclic aliphatic hydrocarbon radical of from 1 to 6 carbon atoms, and Ar is a hydrocarbon radical of from 6 to 12 carbon atoms containing aromatic unsaturation and linked by aromatic ring carbon atoms to the hydroxy substituents and to the adjacent alkylidene carbon atom.

By "each Alk" is meant each of $Alk_1$, $Alk_2$, and $Alk_3$. The alkylidene carbon atom adjacent to the radical Ar is the carbonylic carbon residue $$-\underset{|}{C}=$$

substituted by $Alk_1$ and by $(HO)_n$—Ar—.

The present compounds are accordingly ar-hydroxyaryl lower-alkyl ketone di-lower-alkyl hydrazones.

Illustrative of the stated presently provided compounds are, for example, 2'-, 3'-, and 4'-hydroxyacetophenone dimethylhydrazone, 2'-, 3'-, and 4'-hydroxyacetophenone diethylhydrazone, 2'-, 3'-, and 4'-hydroxyacetophenone dibutylhydrazone, 2'-, 3'-, and 4'-hydroxyacetophenone dihexylhydrazone, 2',4'-dihydroxyacetophenone dimethylhydrazone, 3',4'-dihydroxyacetophenone dimethylhydrazone, 2',4' - dihydroxyacetophenone dipropylhydrazone, 2',4',5'-trihydroxyacetophenone dimethylhydrazone, 3',4', 5' - trihydroxyacetophenone dimethylhydrazone, 2',4',5'-trihydroxyacetophenone diethylhydrazone, 2',3',5'-trihydroxyacetophenone dimethylhydrazone, 2'-, 3'-, and 4'-hydroxypropiophenone dimethylhydrazone, 2'-, 3'-, and 4'-hydroxypropiophenone diisobutylhydrazone, 3',4'-dihydroxypropiophenone diethylhydrazone, 2',4',5' - trihydroxypropiophenone dimethylhydrazone, 2'-, 3'-, and 4'-hydroxybutyrophenone dimethylhydrazone, 2',4' - dihydroxybutyrophenone diisopropylhydrazone, 2',4',5'-trihydroxybutyrophenone dimethylhydrazone, 3',4',5' - trihydroxybutyrophenone dihexylhydrazone, 2'-, 3'-, and 4'-hydroxyvalerophenone dimethylhydrazone, 2'-, 3'-, and 4' - hydroxyvalerophenone dibutylhydrazone, 2',4'-dihydroxyvalerophenone dimethylhydrazone, 3',4'-dihydroxyvalerophenone dimethylhydrazone, 2'-, 3'-, and 4'-hydroxyhexanophenone dimethylhydrazone, 2'-, 3'-, and 4'-hydroxyhexanophenone dihexylhydrazone, 2',4' - dihydroxyhexanophenone dibutylhydrazone, 2',4',5' - trihydroxyhexanophenone dimethylhydrazone, 2'-, 3'-, and 4'-hydroxyheptanophenone dimethylhydrazone, 2'-hydroxy-4'-phenyl acetophenone dimethylhydrazone, 4'-t-butyl-2'-hydroxyacetophenone diethylhydrazone, 2' - hydroxy-4'-methylacetophenone dibutylhydrazone, 2',5' - diethyl-4'-hydroxyacetophenone dimethylhydrazone, 2',6'-dipropyl-4'-hydroxypropiophenone dimethylhydrazone, 2'-, 4'-, and 6'-hydroxyacetonaphthone dimethylhydrazone, 2',4'-dihydroxyacetonaphthone diethylhydrazone, and the like. The dihydroxyaryl and the ar-hydroxyacetophenone dialkylhydrazones are especially preferred embodiments of the invention.

The presently provided ar-hydroxy-aryl alkyl ketone dialkylhydrazones are produced by condensing a hydroxyaryl alkyl ketone with a 1,1-dialkylhydrazine. Illustrative of the hydroxyaryl alkyl ketones which may be employed for the preparation of these compounds are, for example, 2'-, 3'-, and 4'-hydroxyacetophenone, 3',4'-dihydroxyacetophenone, 3',4',5-trihydroxyacetophenone, 2'-, 3'-, and 4'-hydroxypropiophenone, 3'-, 4'-dihydroxypropiophenone, 2',5' - dihydroxybutyrophenone, 2'-hydroxy-5'-methylacetophenone, 2'-hydroxy-4'-propylacetophenone, 3'-hydroxy-4'-phenylpropiophenone, 2',4' - dihydroxyvalerophenone, 2'-, 3'-, and 4'-hydroxyheptanophenone, 3', 4'-dihydroxyacetonaphthone, 2',4',5'-trihydroxyacetophenone, 3',4'-dihydroxy-5'-(2-ethylbutyl)acetophenone and the like.

Illustrative of the dialkylhydrazines which may be condensed with the stated ketones to provide the present novel compounds are, for example, 1,1-dimethylhydrazine, 1,1-diethylhydrazine, 1,1-di-n-propylhydrazine, 1-ethyl-1-methylhydrazine, 1,1-dibutylhydrazine, 1,1-dipentylhydrazine, 1,1-dihexylhydrazine, and the like.

In conducting the preparation of the present compounds, the hydroxy-substituted-aryl alkyl ketone is contacted with the 1,1-dialkylhydrazine while water (which is the by-product of the reaction) is removed. The condensation reaction taking place is illustrated by the equation $$(HO)_n\text{—}Ar\text{—}\underset{Alk_1}{\overset{}{C}}\text{=}O + H_2N\text{—}\underset{Alk_3}{\overset{}{N}}\text{—}Alk_2 \longrightarrow$$

$$(HO)_n\text{—}Ar\text{—}\underset{Alk_1}{\overset{}{C}}\text{=}\underset{Alk_3}{\overset{}{N}}\text{N—}Alk_2 + H_2O$$

where $n$, Ar and each Alk are as defined above.

The ratio of the ketone to the hydrazine may vary over a wide range, such as from 10:1 to 1:10 mole per mole. Usually it is advantageous to employ about the stoichiometric ratio of 1:1 mole per mole ($\pm 10$–$20\%$, say). It may be advantageous to employ a solvent or a diluent in the reaction mixture. Suitable inert organic solvents and diluents in this connection include hydrocarbons such as benzene, toluene or hexane, oxygenated solvents such as ethers like dioxane, diethyl ether, tetrahydrofuran, diglyme (dimethyl ether of ethylene glycol) and so forth, or alcohols such as ethanol, butanol, hexanol or the like, chlorinated hydrocarbons such as dichloroethylene, chloropentane or the like, and so forth.

To accelerate the rate of reaction if desired, heating may be employed. Temperatures used may vary from down to where the reaction mixture is barely liquid up to just below the decomposition temperatures of the reaction mixture components. The rapidity of the reaction will vary with the reactants chosen, and in some cases the reaction may be exothermic and require cooling and/or diluents to moderate its violence, while other pairs of reactants may not react completely until after refluxing at elevated temperatures. In general, suitable temperatures for carrying out the reaction comprise temperatures in the range of from 50 to 150° C., or the reflux temperature of the reaction mixture. Pressure variation may also be utilized to facilitate conducting the reaction, for example, by carrying out the reaction in a pressure-resistant vessel under autogenous pressure and elevated temperatures. The pressures may vary from superatmospheric pressures up to say 5000 p.s.i., down to subatmospheric pressures as low as say 0.05 mm. Hg, although usually normal atmospheric pressures are suitable.

The time required to accomplish the reaction depends on functional factors such as the reactivity of the reactants, the temperature of the reaction and the like. Reaction rates and times of reaction may vary considerably also depending on the details of apparatus and other operational conditions. By suitable arrangements, continuous procedures may be substituted for the batch type operation described below. On completion of the reaction, the products may be recovered by conventional methods such as precipitation, vaporization, distillation, extraction and the like.

The presently provided products are stable, generally solid materials which are useful for a variety of agricultural and industrial purposes. Thus, they may be employed as stabilizers in polymeric compositions, to prevent the degradation of vinyl polymers, particularly as ultraviolet absorption agents. They may be employed as microbiological growth control agents, to suppress the growth of bacteria and fungi. They can be used as insecticides, and they are particularly useful as herbicides, especially for the pre-emergent control of the growth of undesired vegetation.

The invention is illustrated but not limited by the following example.

A mixture of 150 grams (g.) of 2',4'-dihydroxyacetophenone (1 mole) with 500 milliliters (ml.) of benzene is stirred while 66 g. (1.1 mole) of 1,1-dimethylhydrazine is gradually added. When the addition is complete, the mixture is refluxed for 14 hours. The benzene and the unreacted dimethylhydrazine are evaporated off from the reaction mixture, leaving a solid residue which is recrystallized from benzene. The product, M.P. 133.5–135.5° C., is 2',4'-dihydroxyacetophenone dimethylhydrazone. The elemental analysis corresponds to the assigned structure:

Calcd. for $C_{10}H_{14}N_2O_2$: C, 61.83; H, 7.26; N, 14.43%.
Found: C, 61.8; H, 7.2; N, 14.4%.

In an illustrative application of this chemical as a herbicide, soil containing weed and crop seeds is sprayed with an acetone solution of 2',4'-dihydroxyacetophenone dimethylhydrazone, in a concentration corresponding to 25 lbs./acre. The sprayed soil is observed two weeks later, after maintenance under conditions conducive to germination and growth of the seeds. Sorghum and soybean, it is found, are entirely unharmed, and have germinated and grown normally, whereas the chemical treatment has produced substantial to complete suppression of the emergence and growth of pigweed, foxtail and wild buckwheat.

While the invention has been described with particular reference to specific preferred embodiments thereof, it will be appreciated that modifications and variations can be made without departure from the scope of the invention, which is limited only as defined in the appended claim.

What is claimed is:
1. 2',4'-dihydroxyacetophenone dimethylhydrazone.

References Cited

UNITED STATES PATENTS 3,213,138    10/1955    Biel _____ 260—569

OTHER REFERENCES

Kapil et al., "Chemical Abstracts," vol. 54, pp. 9949–50 (1960).

Wiley et al., "Journal Organic Chemistry," vol. 22, pp. 204–7 (1957).

CHARLES B. PARKER, *Primary Examiner.*

R. V. HINES, *Assistant Examiner.*